H. E. ABBOTT AND E. ENZ.
TRACTOR STEERING DEVICE.
APPLICATION FILED JULY 11, 1919.

1,327,511.

Patented Jan. 6, 1920.

WITNESS:
R. A. Thomas

INVENTORS:
H. E. Abbott
BY Ezra Enz
Victor J. Evans
ATTORNEY.

UNITED STATES PATENT OFFICE.

HERBERT E. ABBOTT AND EZRA ENZ, OF OAKVILLE, IOWA.

TRACTOR STEERING DEVICE.

1,327,511.　　　　Specification of Letters Patent.　　Patented Jan. 6, 1920.

Application filed July 11, 1919. Serial No. 310,031.

*To all whom it may concern:*

Be it known that we, HERBERT E. ABBOTT and EZRA ENZ, citizens of the United States, residing at Oakville, in the county of Louisa and State of Iowa, have invented new and useful Improvements in Tractor Steering Devices, of which the following is a specification.

This invention relates to an improvement in mechanical steering devices for tractors or the like, in the use of which the operator either on the tractor or on a remote following machine may steer the tractor in either direction as readily as with the ordinary hand steering mechanism.

The invention broadly stated comprises a friction wheel continuously rotated from the motive power of the tractor and opposed traction disks operating in conjunction with said wheels and having sprockets and chain connections with the steering drum or mechanism of the tractor. Through the medium of a lever one or the other of such friction disks may be brought into engagement with the friction wheel and thereby the chain driven steering controlling shaft operated in the desired direction to steer the tractor as required.

Figure 1:
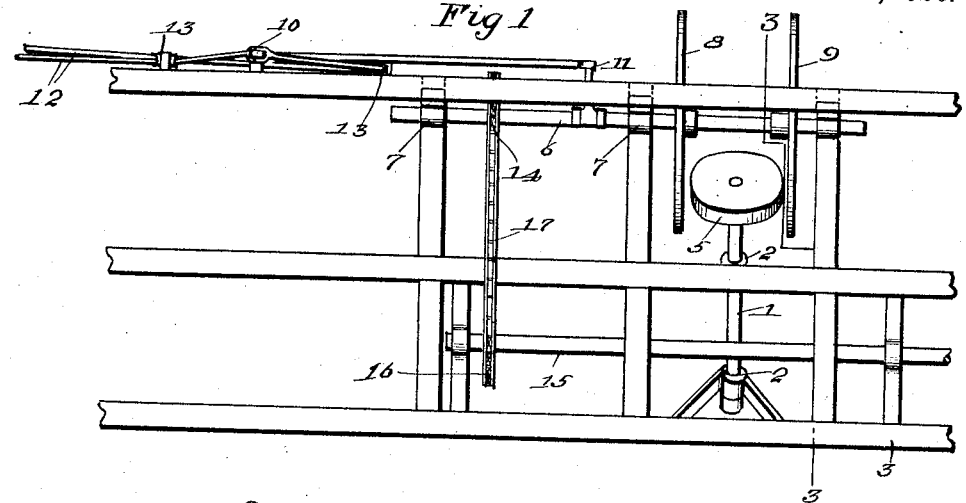
Figure 1 is a plan view of the improved steering mechanism.
Figure 2:
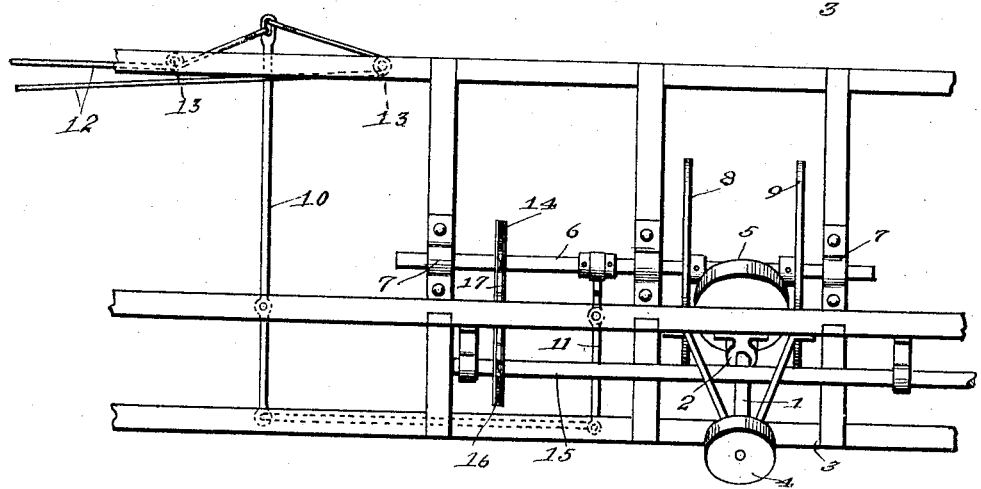
Fig. 2 is an elevation of the same.
Figure 3:
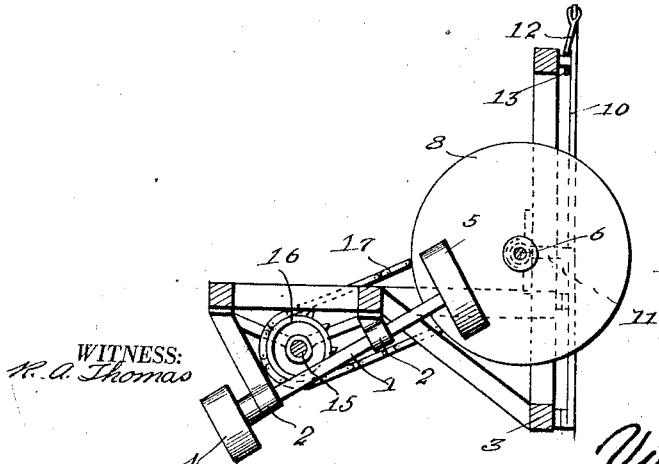
Fig. 3 is a section through the line 3—3 of Fig. 1.

The improved steering mechanism comprises a driven shaft 1 mounted in bearings 2, extending from a suitable frame work 3, which latter may be part of the tractor frame work or an auxiliary frame work secured thereto for the purpose of carrying the improved steering mechanism. On one end of the shaft 1 is mounted a belt wheel 4, adapted to be driven by a suitable belt from the motive power of the tractor, that is the shaft 1 is continuously driven during the operation of such motive power. On the opposite end of the shaft 1 is secured a friction wheel 5, which wheel is of substantial cylindrical surface as shown.

At right angles to the shaft 1 and beyond the friction wheel 5 is mounted a shifting shaft 6, the latter being supported for limited longitudinal movement in bearings 7, secured to the frame 3. Secured on the shaft 6 are friction disks 8 and 9, these disks being of considerable diameter and arranged so that their peripheral edges extend inwardly of and in diametric relation to the friction wheel 5. An operating lever 10 has one arm 11 thereof connected to the shaft 6, so that said shaft may be longitudinally shifted to cause either of the friction disks 8 or 9 to be brought into frictional coöperation with the wheel 5. A lever 10 is mounted so that it may be conveniently operated in either direction, and in this connection I contemplate the provision of means such as cables 12 mounted with relation to pulleys 13, fixed upon the tractor, which cables extend rearwardly beyond the tractor, so that the lever 10 may be shifted in either direction to cause the proper disk 8 or 9 to engage the wheel 5 from a position beyond and remote from the tractor proper as on a farming implement drawn by the tractor.

Secured upon the shaft 6 at the end remote from that on which the disks 8 and 9 are mounted is a sprocket wheel 14. A steering shaft 15 is supported in bearings pendent from the frame 3 and one end of this shaft is provided in line with the sprocket 14 with a similar sprocket 16, the said sprockets 14 and 16 being connected by a sprocket chain 17. The shaft 15 extends forwardly to the usual steering drum or other direct turning means on the tractor, so that the revolution of the shaft 15 will operate said means to steer the tractor.

From the above described construction, it will be apparent that the shaft 6 and thereby the shaft 15 may be driven in either desired direction by causing the proper disk 8 or 9 as the case may be to be brought into frictional engagement with the friction wheel 5, and that this coöperation of the proper disk 8 or 9 with the wheel 5 may be effected by proper movement of the lever 10. Therefore an operator on the tractor or on the machine following the tractor may readily steer the machine in any desired direction and to the extent desired in a simple expeditious manner. This enables the tractor after having been once started and put in gear to be steered by a man who is mounted upon and operating the following machine as a harrow, rake or the like, and therefore dispenses with the necessity of an attendant upon the tractor, as is now required. The frame work for supporting the improved steering mechanism may be part of the tractor frame work or may be secured as an auxiliary thereto, whereby the present improvement is readily and conveniently adapted to be applied to tractors now in use.

Having described the invention what is claimed as new is:—

A steering mechanism for tractors comprising an operating shaft driven from the motor power of the tractor and having a frictional wheel, a shifting shaft having opposed friction disks, means for shifting said shaft whereby either disk may be brought into contact with the friction wheel and the shifting shaft rotated in a desired direction, an operating shaft directly connected with the turning mechanism of the tractor and driving connections between the shifting shaft and operating shaft, a lever pivoted upon the frame of the tractor and connected with the shifting shaft, a second lever pivoted upon the frame at right angles to the first mentioned lever, a link providing a connection between the adjacent extremities of said levers, cables having their ends connected with the free ends of the second mentioned lever, and pulleys mounted upon the tractor and over which the cables are trained in a direction to permit shifting of the said shaft from a position remote from the tractor.

In testimony whereof we affix our signatures.

HERBERT E. ABBOTT.
EZRA ENZ.